United States Patent
Kadam et al.

(10) Patent No.: US 11,802,616 B1
(45) Date of Patent: Oct. 31, 2023

(54) LOAD ZONE LUBRICANT PATH FOR A CAM ROLLER PIN

(71) Applicant: DEERE & COMPANY, Moline, IL (US)

(72) Inventors: Akshay V. Kadam, Pune (IN); Rohit Bedage, Pune (IN); Dattatray B. Pingle, Nashik (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/060,844

(22) Filed: Dec. 1, 2022

(51) Int. Cl.
| *F16H 53/06* | (2006.01) |
| *F02M 59/10* | (2006.01) |
| *F01L 1/14* | (2006.01) |

(52) U.S. Cl.
CPC ............... *F16H 53/06* (2013.01); *F01L 1/14* (2013.01); *F02M 59/102* (2013.01)

(58) Field of Classification Search
CPC .......... F16H 53/02; F16H 53/06; F16H 53/08; F01L 1/14; F01L 1/16; F01L 2305/02; F01L 2810/02; F02M 59/102; F04B 1/0417
See application file for complete search history.

(56) References Cited

U.S. PATENT DOCUMENTS

| 3,881,788 | A | * | 5/1975 | Kotauczek | .......... F16C 33/1065 |
| | | | | | 384/155 |
| 4,325,589 | A | * | 4/1982 | Hirt | ..................... F16H 57/0479 |
| | | | | | 384/375 |
| 5,178,107 | A | * | 1/1993 | Morel, Jr. | ............... F01M 9/104 |
| | | | | | 123/90.35 |
| 5,501,121 | A | * | 3/1996 | Beier | ................... F01L 13/0057 |
| | | | | | 123/90.6 |
| 5,797,364 | A | * | 8/1998 | Meek | ..................... F16C 13/006 |
| | | | | | 384/375 |
| 6,056,442 | A | * | 5/2000 | Ono | ......................... F16C 33/12 |
| | | | | | 384/292 |

(Continued)

FOREIGN PATENT DOCUMENTS

| CN | 112392567 A | * | 2/2021 | ................ F01L 1/16 |
| CN | 112796914 A | * | 5/2021 | ........... F02M 59/102 |

(Continued)

OTHER PUBLICATIONS

Prosecution history for U.S. Appl. No. 18/060,611 including: Notice of Allowance dated Jul. 17, 2023, Non Final Office Action dated Mar. 17, 2023, and Application and Drawings filed Dec. 1, 2022: 40 pages.

*Primary Examiner* — Adam D Rogers
(74) *Attorney, Agent, or Firm* — Joseph R. Kelly; Kelly, Holt & Christenson PLLC (57) ABSTRACT

A cam roller pin is rotationally fixed and defines a pin axis around which a cam roller is configured to rotate and apply a load at a load zone at a radially outer and lower end of the pin. The pin includes a reservoir configured to receive lubricant for lubrication of the cam roller rotating on the pin, a first lubricant path extending radially inward from the reservoir, a second lubricant path extending from the first lubricant path to a second lubricant path outlet, a third lubricant path extending from the first lubricant path to a third lubricant path outlet, and a load zone lubricant path extending from a load zone lubricant path inlet to the first lubricant path, the second lubricant path, and/or the third lubricant path.

20 Claims, 4 Drawing Sheets

(56) References Cited

U.S. PATENT DOCUMENTS

| | | | |
|---|---|---|---|
| 6,616,338 B2* | 9/2003 | Tibbits | F16C 41/02 |
| | | | 384/513 |
| 7,748,359 B2* | 7/2010 | Bartley | F01L 1/146 |
| | | | 123/90.48 |
| 7,878,169 B2* | 2/2011 | Brinks | F02M 59/44 |
| | | | 123/90.55 |
| 8,425,360 B2* | 4/2013 | Nishida | F16C 33/1045 |
| | | | 475/159 |
| 8,967,037 B2* | 3/2015 | Jones | F02M 59/102 |
| | | | 92/129 |
| 9,109,628 B2* | 8/2015 | Sieveking | F16C 33/1055 |
| 9,546,724 B2* | 1/2017 | Unes | F16H 53/06 |
| 2022/0282641 A1* | 9/2022 | Bhattacharjya | F01L 1/146 |

FOREIGN PATENT DOCUMENTS

| | | | | |
|---|---|---|---|---|
| DE | 102011003902 A1 * | 8/2012 | | F01L 1/14 |
| DE | 102017114177 A1 * | 12/2018 | | F02M 59/02 |
| DE | 102019105208 A1 | 9/2020 | | |
| JP | 2018123846 A * | 8/2018 | | |

\* cited by examiner

LOAD ZONE LUBRICANT PATH FOR A CAM ROLLER PIN

BACKGROUND

Internal combustion engines may include a camshaft having at least one cam lobe to rotate and move a push rod via a cam follower assembly to operate one or more valves at the cylinder head of the engine. The cam follower assembly may include a cam roller rotating on a cam roller pin upon engagement with the cam lobe. The cam follower assembly may include lubricant to reduce friction and cool surfaces in and around the cam follower assembly, including on surfaces of the cam roller.

SUMMARY

According to an aspect of the present disclosure, a cam roller pin is rotationally fixed and defines a pin axis around which a cam roller is configured to rotate and apply a load at a load zone at a radially outer and lower end of the pin. The pin includes a reservoir disposed at a radially outer and upper end of the pin configured to receive lubricant for lubrication of the cam roller rotating on the pin, a first lubricant path extending radially inward from the reservoir, a second lubricant path extending from the first lubricant path to a second lubricant path outlet, a third lubricant path extending from the first lubricant path to a third lubricant path outlet, and a load zone lubricant path extending from a load zone lubricant path inlet at the load zone at the radially outer and lower end of the pin to the first lubricant path, the second lubricant path, and/or the third lubricant path.

The load zone lubricant path may include a fourth lubricant path extending from the load zone lubricant path inlet to a radially inner end of the fourth lubricant path. The load zone lubricant path may further include a fifth lubricant path extending from the radially inner end of the fourth lubricant path to the second lubricant path. The fifth lubricant path may further extend downward from the radially inner end of the fourth lubricant path to a fifth lubricant path outlet at the second lubricant path. The load zone lubricant path may further include a sixth lubricant path extending from the radially inner end of the fourth lubricant path to the third lubricant path. The sixth lubricant path may extend downward from the radially inner end of the fourth lubricant path to a sixth lubricant path outlet at the third lubricant path. The second lubricant path outlet may be disposed outside of the load zone of the load from the cam roller. The third lubricant path outlet may be disposed outside of the load zone of the load from the cam roller. The first lubricant path may extend from a first lubricant path inlet disposed at the reservoir on the second radial side of the pin. The second lubricant path and the third lubricant path may extend from the first lubricant path at a lubricant path intersection that is vertically aligned with the load zone of the load of the cam roller.

According to an aspect of the present disclosure, a cam roller pin is rotationally fixed and defines a pin axis around which a cam roller is configured to rotate and apply a load at a load zone at a radially outer and lower end of the pin. The pin includes a reservoir disposed at a radially outer and upper end of the pin configured to receive lubricant for lubrication of the cam roller rotating on the pin, a plurality of first lubricant paths each extending radially inward from the reservoir, a plurality of second lubricant paths each extending from one of the plurality of first lubricant paths to one of a plurality of second lubricant path outlets, a plurality of third lubricant paths each extending from one of the plurality of first lubricant paths to one of a plurality of third lubricant path outlets, and a plurality of load zone lubricant paths each extending from one of a plurality of load zone lubricant path inlets at the load zone at the radially outer and lower end of the pin to the plurality of first lubricant paths, the plurality of second lubricant paths, and/or the plurality of third lubricant paths. Each of the plurality of first lubricant paths is axially spaced apart, each of the plurality of second lubricant paths is axially spaced apart, each of the plurality of third lubricant paths is axially spaced apart, and each of the plurality of load zone lubricant paths is axially spaced apart.

Each of the plurality of load zone lubricant paths may include a fourth lubricant path extending from the load zone lubricant path inlet to a radially inner end of the fourth lubricant path. Each of the plurality of load zone lubricant paths may further include a fifth lubricant path extending from the radially inner end of the fourth lubricant path to one of the plurality of second lubricant paths. Each fifth lubricant path may extend downward from the radially inner end of the fourth lubricant path to a fifth lubricant path outlet at one of the plurality of second lubricant paths. Each of the plurality of load zone lubricant paths may include a sixth lubricant path extending from the radially inner end of the fourth lubricant path to one of the plurality of third lubricant paths. Each sixth lubricant path may extend downward from the radially inner end of the fourth lubricant path to a sixth lubricant path outlet at one of the plurality of third lubricant paths.

According to an aspect of the present disclosure, a cam follower assembly includes a housing, a pin fixed with the housing, defining a pin axis, and configured for reciprocal movement with the housing, and a cam roller configured to rotate around the pin axis of the pin from engagement with a cam lobe at a lower end of the housing and apply a load to the pin at a load zone corresponding to the lower end of the housing. The pin includes a reservoir disposed at a radially outer and upper end of the pin configured to receive lubricant for lubrication of the cam roller rotating on the pin, a first lubricant path extending radially inward from the reservoir, a second lubricant path extending from the first lubricant path to a second lubricant path outlet, a third lubricant path extending from the first lubricant path to a third lubricant path outlet, and a load zone lubricant path extending from a load zone lubricant path inlet at the load zone at the lower end of the housing to the first lubricant path, the second lubricant path, and/or the third lubricant path.

The load zone lubricant path may include a fourth lubricant path extending from the load zone lubricant path inlet to a radially inner end of the fourth lubricant path. The load zone lubricant path may include a fifth lubricant path extending from the radially inner end of the fourth lubricant path to the second lubricant path. The load zone lubricant path may include a sixth lubricant path extending from the radially inner end of the fourth lubricant path to the third lubricant path.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
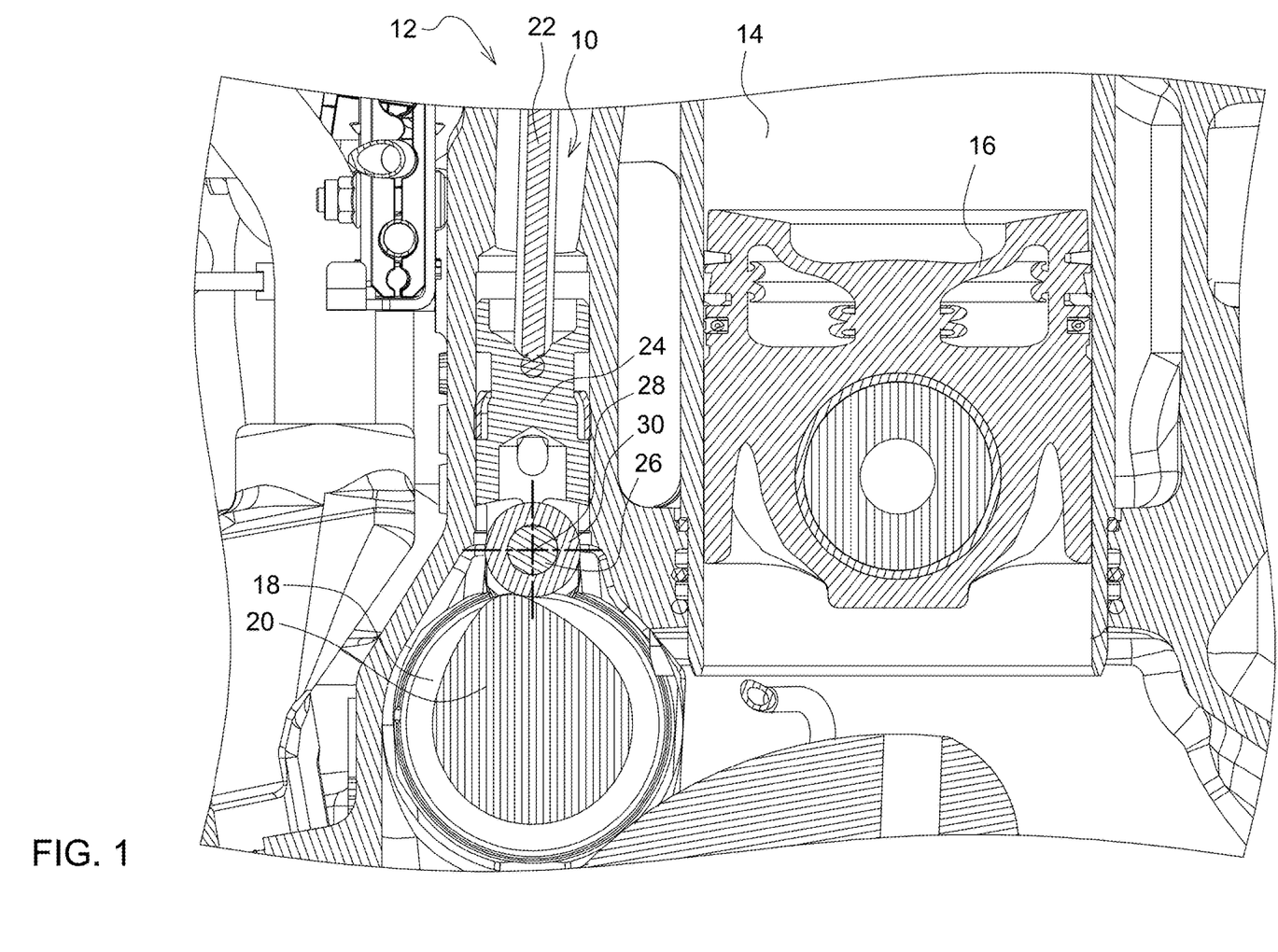
FIG. 1 illustrates a cam follower assembly in accordance with an embodiment of the present disclosure.
Figure 2:
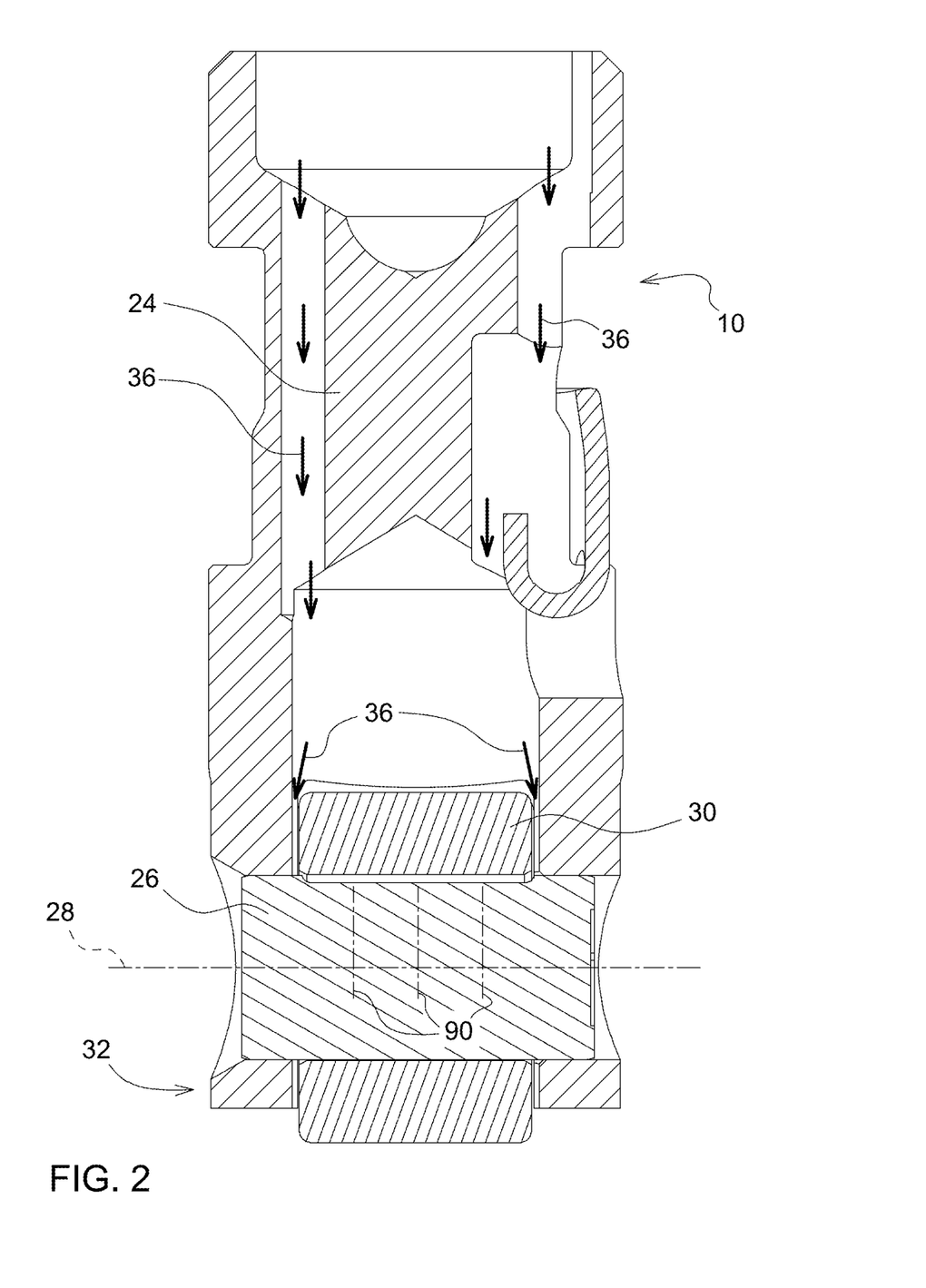
FIG. 2 illustrates a cam follower assembly in accordance with an embodiment of the present disclosure.

Referring to FIGS. 1 and 2, a cam follower assembly 10 is illustrated as forming a part of an internal combustion engine 12, such as a diesel, gasoline, or other engine the engine 12 including at least one cylinder 14, at least one piston 16, and a camshaft 18 having at least one cam lobe 20 and being driven by a crankshaft (not shown) of the engine 12 to operate one or more valves (not shown) via a pushrod 22, as generally understood by one having ordinary skill in the art.

Figure 3A:
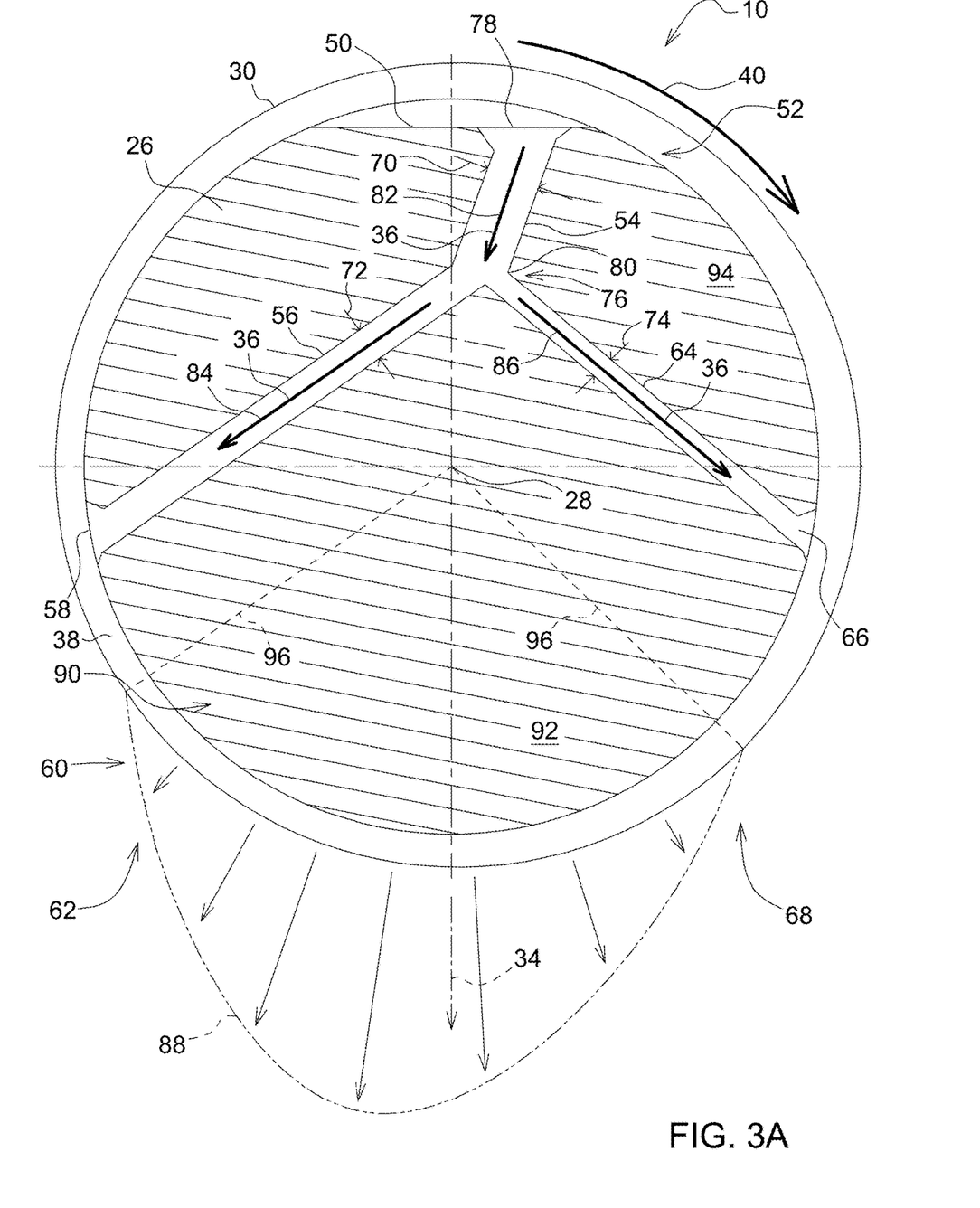
FIG. 3A illustrates a cam follower assembly in accordance with an embodiment of the present disclosure.
Figure 3B:
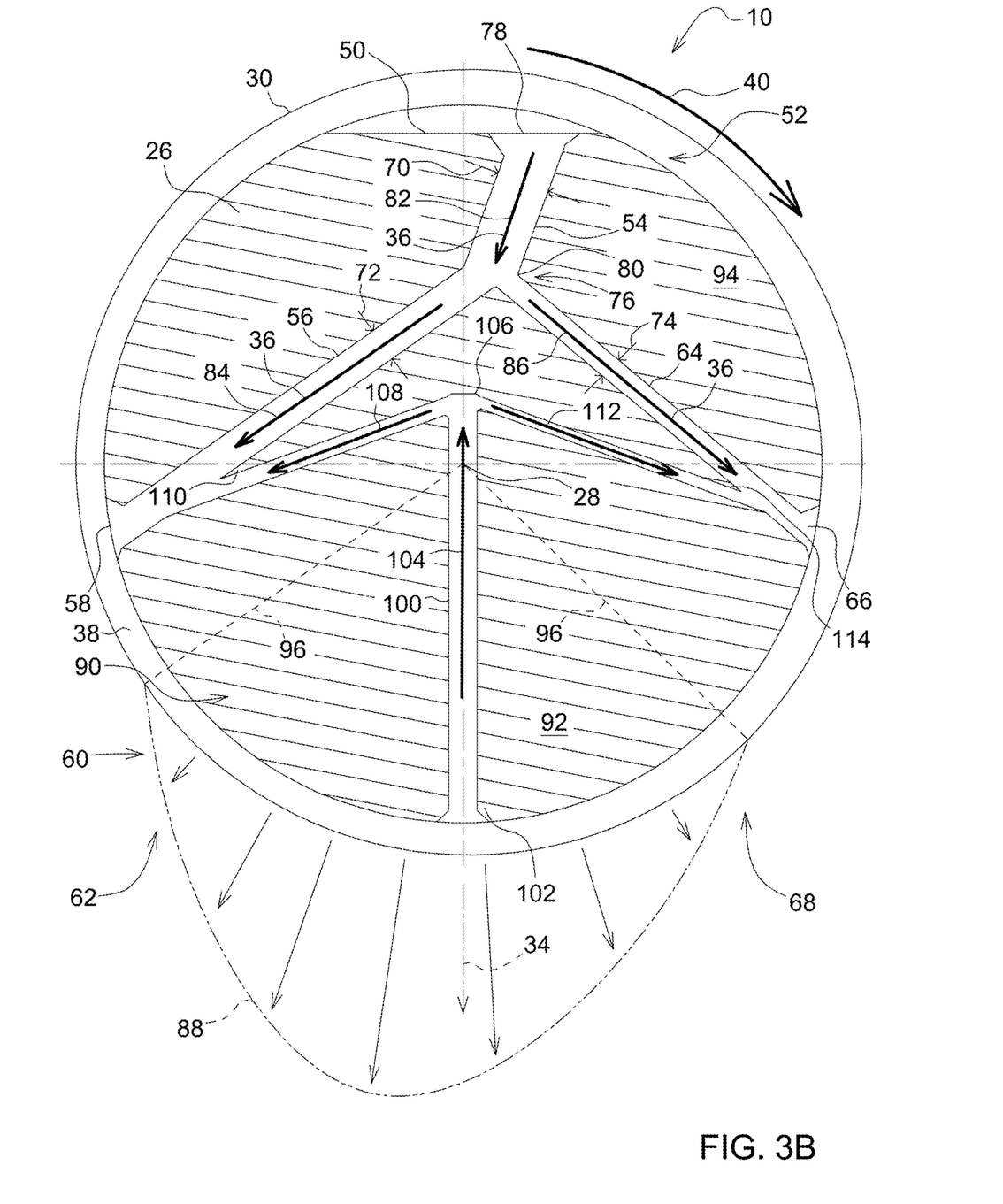
FIG. 3B illustrates a cam follower assembly in accordance with an embodiment of the present disclosure.

The assembly 10 of FIGS. 1 and 2 includes a housing 24 connected to the pushrod 22 and a pin 26 fixed with the housing 24 for reciprocal movement or operation of the pushrod 22, the housing 24, and the pin 26. The pin 26 defines a pin axis 28 as shown in FIGS. 1-3. The assembly 10 further includes a cam roller 30 rotating around, against, and/or on the pin 26. The cam roller 30 rotates around the pin axis 28 or around an axis generally corresponding to the pin axis 28 of the pin 26 from engagement of the cam roller 30 with the cam lobe 20 at a lower end 32 of the housing 24.

Lubricant 36 is supplied to assembly 10, such as by gravity, through the housing 24 to the cam roller 30 and the pin 26, as illustrated in FIG. 2. In additional embodiments, the lubricant 36 is supplied by pressure and/or from different location(s) at or around the assembly 10.

Referring now to FIGS. 3A and 3B, the cam roller 30 applies a load from the load direction 34 to the pin 26 at a load zone 88 corresponding to the lower end 32 of the housing 24. The load zone 88 is defined by or otherwise falls within a divergent zone 92 defined by the load zone boundary lines 96. A convergent zone 94 is established outside of the divergent zone 92, as illustrated in FIGS. 3A and 3B. In the illustrated embodiments, the load is applied at the load zone 88 at a radially outer and lower end 60 of the pin 26. The lubricant 36 forms a lubricant film 38 between the cam roller 30 and the pin 26. The load at the load zone 88 increases the pressure of the lubricant 36 at the load zone 88 relative to pressures of the lubricant 36 at locations away from the load zone 88. The cam roller 30 rotates in a cam roller rotation direction 40. The cam roller rotation direction 40, which may be clockwise or counterclockwise relative to the view of the pin axis 28 shown in FIGS. 3A and 3B, affects the location and/or other characteristics of the load zone 88 due to the lubricant 36 of the lubricant film 38 being affected by the rotating surface of the cam roller 30.

The pin 26 illustrated in FIGS. 3A and 3B includes a reservoir 50 disposed at a radially outer and upper end 52 of the pin 26. The reservoir 50 receives the lubricant 36 for lubrication of the cam roller 30 rotating on the pin 26 in an embodiment.

The pin 26 further includes a first lubricant path 54 extending radially inward from the reservoir 50. The pin 26 further includes a second lubricant path 56 extending from the first lubricant path 54 to a second lubricant path outlet 58 at the radially outer and lower end 60 of the pin 26 at a first radial side 62 of the pin 26. In an embodiment, the first lubricant path 54 extends in a single direction 82 from the reservoir 50 to the second lubricant path 56. The second lubricant path 56 of an embodiment extends in a single direction 84 from the first lubricant path 54 to the second lubricant path outlet 58.

The pin 26 further includes a third lubricant path 64 extending from the first lubricant path 54 to a third lubricant path outlet 66 at the radially outer and lower end 60 of the pin 26 at a second radial side 68 of the pin 26 opposite from the first radial side 62 of the pin 26. In the illustrated embodiment, the first radial side 62 is a first lateral side or a left-hand side of the pin 26 and the second radial side 68 is a second lateral side or a right-hand side of the pin 26, as illustrated in FIGS. 3A and 3B. The second lubricant path 56 and the third lubricant path 64 each extend from a radially inner end 76 of the first lubricant path 54. The third lubricant path 64 extends in a single direction 86 from the first lubricant path 64 to the third lubricant path outlet 66 in an embodiment.

Due to the roller rotation direction 40 and/or other characteristics of the assembly 10, the pressure and/or supply of the lubricant 36 at the reservoir 50 is greater on the second radial side 68 of the pin 26 relative to the first radial side 62. Therefore, the first lubricant path 54 extends from a first lubricant path inlet 78 disposed at the reservoir 50 on the second radial side 68 of the pin 26.

As shown in FIGS. 3A and 3B, in accordance with certain embodiments, the second lubricant path outlet 58 and/or the third lubricant path outlet 66 is/are disposed circumferentially or otherwise outside of the load zone 88 of the load from the cam roller 30. In an embodiment, no path or connection extends through the pin 26 to the location of the load zone 88 and/or no outlet of any path is located circumferentially or otherwise within or at the load zone 88. As such, the lubricant 36 flows to the lower end 60 of the pin 26 without being affected by the relatively higher pressure of the lubricant 36 at the load zone 88.

The first lubricant path 54 has a first lubricant path width 70 or diameter or thickness greater than each of a second lubricant path width 72 of the second lubricant path 56 and a third lubricant path width 74 of the third lubricant path 64. The first lubricant path width 70 receives a sufficient amount of the lubricant 36 to supply both the second lubricant path 56 and the third lubricant path 64. In the illustrated embodiment, there is a greater need for lubrication at the first radial side 62 of the pin 26 relative to the second radial side 68 of the pin due to the roller rotation direction 40, the load, and/or other characteristics of the assembly 10. Therefore, the second lubricant path width 72 of the embodiments of FIGS. 3A and 3B is greater than the third lubricant path width 74 to supply more lubricant 36 to the first radial side 62 than the second radial side 68.

In an embodiment, such as shown in FIG. 3B, the second lubricant path 56 and the third lubricant path 64 extend from the first lubricant path 54 at a lubricant path intersection 80 that is vertically or diametrically aligned with the load zone 88 of the load of the cam roller 30. In an embodiment, the lubricant path intersection 80 is vertically or diametrically aligned with the load direction 34 of the load from the cam roller 30, as illustrated in FIG. 3B.

In one or more embodiments, the assembly 10 and/or the pin 26 further includes a load zone lubricant path 100, as illustrated in FIG. 3B. In accordance with various embodiments, the load zone lubricant path 100 extends from a load zone lubricant path inlet 102 at the load zone 88 at the radially outer and lower end 60 of the pin 26 to the first lubricant path 54, the second lubricant path 56, and/or the third lubricant path 64.

The load zone lubricant path 100 shown in FIG. 3B includes a fourth lubricant path 104 extending from the load zone lubricant path inlet 102 to a radially inner end 106 of the fourth lubricant path 104. The load zone lubricant path 100 shown in FIG. 3B further includes a fifth lubricant path 108 extending from the radially inner end 106 of the fourth lubricant path 104 to the second lubricant path 56. The load zone lubricant path 100 further includes a sixth lubricant path 112 extending from the radially inner end 106 of the fourth lubricant path 104 to the third lubricant path 64.

The fifth lubricant path 108 extends downward from the radially inner end 106 of the fourth lubricant path 104 to a fifth lubricant path outlet 110 at the second lubricant path 56. The sixth lubricant path 112 extends downward from the radially inner end 106 of the fourth lubricant path 104 to a sixth lubricant path outlet 114 at the third lubricant path 64. The fifth lubricant path outlet 110 and the sixth lubricant path outlet 114 are located between the lubricant path intersection 80, or the inner ends of the second lubricant path 56 and third lubricant path 64, and each of the second lubricant path outlet 58 and the third lubricant path outlet 66 in the illustrated embodiment of FIG. 3B. In one or more additional embodiments, the fifth lubricant path outlet 110 and/or the sixth lubricant path outlet 114 is/are located at the lubricant path intersection 80, or one or both of the inner ends of the second lubricant path 56 and third lubricant path 64, or is/are located at the second lubricant path outlet 58 and/or the third lubricant path outlet 66.

The fourth lubricant path 104 is vertically aligned with the load zone 88 and/or the reservoir 50 in the embodiment shown in FIG. 3B. The fourth lubricant path 104 is vertically aligned with the second lubricant path 56 in the embodiment illustrated in FIG. 3B.

Although FIGS. 3A and 3B illustrates a single, radially aligned lubricant path series 90, FIG. 2 illustrates three identical lubricant path series 90, each being axially spaced apart and radially aligned in the pin 26. In additional embodiments not illustrated, the pin 26 includes two or more than three lubricant path series 90 that are identical or non-identical. The pin 26 of the illustrated embodiment includes a plurality of first lubricant paths 54, each extending radially inward from the reservoir 50. The pin 26 illustrated in FIG. 2 further includes a plurality of second lubricant paths 56, each extending from the first lubricant path 54 to the second lubricant path outlet 58 at the radially outer and lower end 60 of the pin 26 at the first radial side 62 of the pin 26, as shown in detail in FIGS. 3A and 3B. The pin 26 of FIG. 2 further includes a plurality of third lubricant paths 64, each extending from the first lubricant path 54 to the third lubricant path outlet 66 at the radially outer and lower end 60 of the pin 26 at the second radial side 68 of the pin 26 opposite from the first radial side 62 of the pin 26, as shown in detail in FIGS. 3A and 3B. The pin 26 of FIG. 2 may further include, in one or more embodiments, a plurality of load zone lubricant paths 100, each extending from a plurality of load zone lubricant path inlets 102 at the load zone 88 to the plurality of first lubricant paths 54, the plurality of second lubricant paths 56, and/or the plurality of third lubricant paths 64, as described further in the present disclosure with regard to embodiments including the load zone lubricant path 100 illustrated in FIG. 3B. In the multiple series 90 illustrated in FIG. 2, each of the plurality of first lubricant paths 54 is axially spaced apart, each of the plurality of second lubricant paths 56 is axially spaced apart, each of the plurality of third lubricant paths 64 is axially spaced apart. Each of the plurality of load zone lubricant paths 100 is axially spaced apart in an embodiment. Further, each lubricant path series 90 includes any element or function described with regard to one or more other embodiments of the pin 26 and/or the assembly 10 described in the present disclosure.

The assembly 10 and the pin 26 according to embodiments disclosed herein provide improved lubrication to surfaces of the pin 26 and the cam roller 30 without reducing supply of lubricant to other portions of the assembly 10 or the internal combustion engine 12. The embodiments disclosed herein provide lubrication to the pin 26 and the cam roller 30 during both low and high cam roller speed conditions, and lubrication increases with increased speed. Further, the locations, sizing, and positioning of first lubricant path 54, second lubricant path 56, and third lubricant path 64 supply lubricant to circumferential locations around the pin 26 in need of lubrication and not subject to high fluid pressures. The centrifugal force created by the rotating cam roller 30 acts on the lubricant 36 at or in the reservoir 50 to push, force, or otherwise move the lubricant 36 into the first lubricant path 54, the second lubricant path 56, and the third lubricant path 64. The outlets 58, 66 are positioned such that the centrifugal force acting on the lubricant 36 pushes, forces, or otherwise moves the lubricant 36 through the outlets 58, 66 above or outside of the load zone 88. Because the outlets 58, 66 are not located within the load zone 88, the lubricant 36 is not subjected to higher pressures and is therefore prevented from flowing backward toward the reservoir 50.

Further, the assembly 10 and the pin 26 of various embodiments utilizes the relatively higher-pressure lubricant 36 at the load zone 88 to supply lubricant 36, through the load zone lubricant path 100, to the lubricant film 38 outside of the load zone 88, as described herein and illustrated in FIG. 3B. The technical effects and benefits described above further apply with regard to the embodiments associated with FIB. 3B, including such embodiments providing lubrication to the pin 26 and the cam roller 30 at all speed conditions of the cam roller 30.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments. The steps of determining, measuring, or sensing, as described in any methods or functions of embodiments described herein, may be used interchangeably in one or more embodiments of the present disclosure.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A cam roller pin rotationally fixed and defining a pin axis around which a cam roller is configured to rotate and apply a load at a load zone at a radially outer and lower end of the pin, the pin comprising:
   a reservoir disposed at a radially outer and upper end of the pin configured to receive lubricant for lubrication of the cam roller rotating on the pin;
   a first lubricant path extending radially inward from the reservoir;
   a second lubricant path extending from the first lubricant path to a second lubricant path outlet;
   a third lubricant path extending from the first lubricant path to a third lubricant path outlet; and
   a load zone lubricant path extending from a load zone lubricant path inlet at the load zone at the radially outer and lower end of the pin to at least one of the first lubricant path, the second lubricant path, and the third lubricant path and configured to deliver lubricant to at least one of the first lubricant path, the second lubricant path, and the third lubricant path.

2. The pin of claim 1, wherein the load zone lubricant path comprises a fourth lubricant path extending from the load zone lubricant path inlet to a radially inner end of the fourth lubricant path.

3. The pin of claim 2, wherein the load zone lubricant path further comprises a fifth lubricant path extending from the radially inner end of the fourth lubricant path to the second lubricant path.

4. The pin of claim 3, wherein the fifth lubricant path extends downward from the radially inner end of the fourth lubricant path to a fifth lubricant path outlet at the second lubricant path.

5. The pin of claim 3, wherein the load zone lubricant path further comprises a sixth lubricant path extending from the radially inner end of the fourth lubricant path to the third lubricant path.

6. The pin of claim 5, wherein the sixth lubricant path extends downward from the radially inner end of the fourth lubricant path to a sixth lubricant path outlet at the third lubricant path.

7. The pin of claim 1, wherein the second lubricant path outlet is disposed outside of the load zone of the load from the cam roller.

8. The pin of claim 1, wherein the third lubricant path outlet is disposed outside of the load zone of the load from the cam roller.

9. The pin of claim 1, wherein the first lubricant path extends from a first lubricant path inlet disposed at the reservoir on a radial side of the pin.

10. The pin of claim 1, wherein the second lubricant path and the third lubricant path extend from the first lubricant path at a lubricant path intersection that is vertically, aligned with the load zone of the load of the cam roller.

11. A cam roller pin rotationally fixed and defining a pin axis around which a cam roller is configured to rotate and apply a load at a load zone at a radially outer and lower end of the pin, the pin comprising:
   a reservoir disposed at a radially outer and upper end of the pin configured to receive lubricant for lubrication of the cam roller rotating oil the pin;
   a plurality of first lubricant paths each extending radially inward from the reservoir;
   a plurality of second lubricant paths each extending from one of the plurality of first lubricant paths to one of a plurality of second lubricant path outlets;
   a plurality of third lubricant paths each extending from one of the plurality of first lubricant paths to one of a plurality of third lubricant path outlets; and
   a plurality of load zone lubricant paths each extending from one of a plurality of load zone lubricant path inlets at the load zone at the radially outer and lower end of the pin to at least one of the plurality of first lubricant paths, the plurality of second lubricant paths, and the plurality of third lubricant paths;
   wherein each of the plurality of first lubricant paths is axially spaced apart, each of the plurality of second lubricant paths is axially spaced apart, each of the plurality of third lubricant paths is axially spaced apart, and each of the plurality of load zone lubricant paths is axially spaced apart.

12. The pin of claim 11, wherein each of the plurality of load zone lubricant paths comprises a fourth lubricant path extending from the load zone lubricant path inlet to a radially inner end of the fourth lubricant path.

13. The pin of claim 12, wherein each of the plurality of load zone lubricant paths further comprises a fifth lubricant path extending from the radially inner end of the fourth lubricant path to one of the plurality of second lubricant paths.

14. The pin of claim 13, wherein each fifth lubricant path extends downward from the radially inner end of the fourth lubricant path to a fifth lubricant path outlet at one of the plurality of second lubricant paths.

15. The pin of claim 13, wherein the each of the plurality of load zone lubricant paths further comprises a sixth lubricant path extending from the radially inner end of the fourth lubricant path to one of the plurality of third lubricant paths.

16. The pin of claim 15, wherein each sixth lubricant path extends downward from the radially inner end of the fourth lubricant path to a sixth lubricant path outlet at one of the plurality of third lubricant paths.

17. A cam follower assembly comprising:
   a housing;
   a pin fixed with the housing, defining a pin axis, and configured for reciprocal movement with the housing;
   a cam roller configured to rotate around the pin axis of the pin from engagement with a cam lobe at a lower end of the housing and apply a load to the pin at a load zone corresponding to the lower end of the housing;
   wherein the pin comprises:
      a reservoir disposed at a radially outer and upper end of the pin configured to receive lubricant for lubrication of the cam roller rotating on the pin;
      a first lubricant path extending radially inward from the reservoir;
      a second lubricant path extending from the first lubricant path to a second lubricant path outlet;
      a third lubricant path extending from the first lubricant path to a third lubricant path outlet; and
      a load zone lubricant path extending from a load zone lubricant path inlet at the load zone at the lower end of the housing to at least one of the first lubricant path, the second lubricant path, and the third lubricant path.

18. The assembly of claim 17, wherein the load zone lubricant path comprises a fourth lubricant path extending from the load zone lubricant path inlet to a radially inner end of the fourth lubricant path.

19. The pin of claim 18, wherein the load zone lubricant path further comprises a fifth lubricant path extending from the radially inner end of the fourth lubricant path to the second lubricant path.

20. The pin of claim 18, wherein the load zone lubricant path further comprises a sixth lubricant path extending from the radially inner end of the fourth lubricant path to the third lubricant path.

\* \* \* \* \*